G. J. KINGSBURY.
Coal Stove.
No. 1,409. Reissued Feb. 17, 1863.
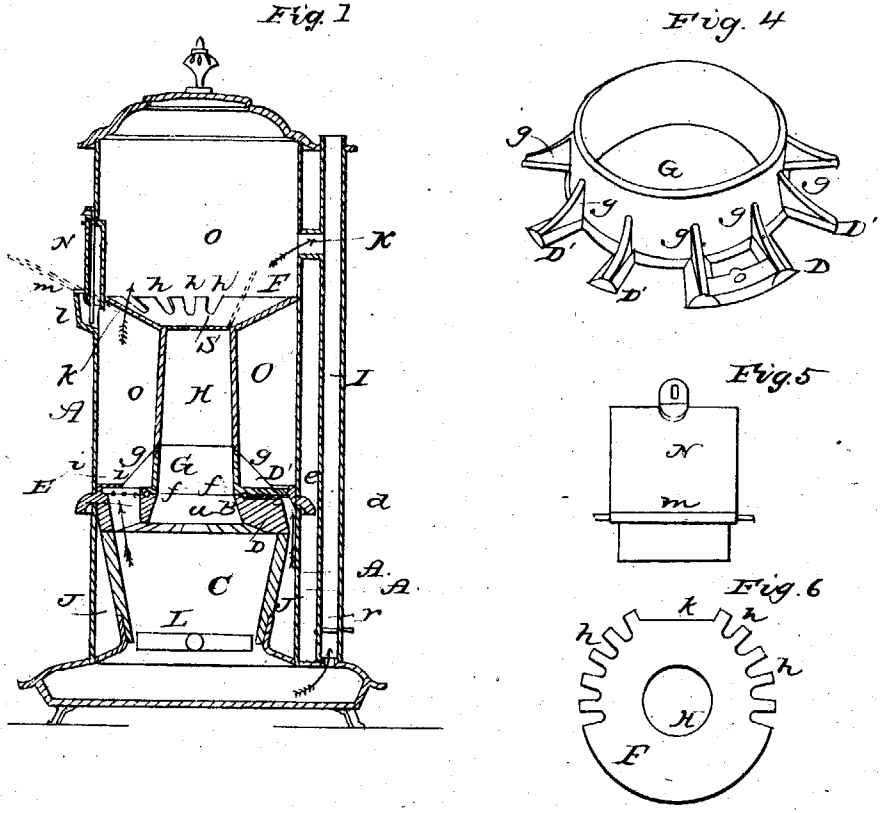
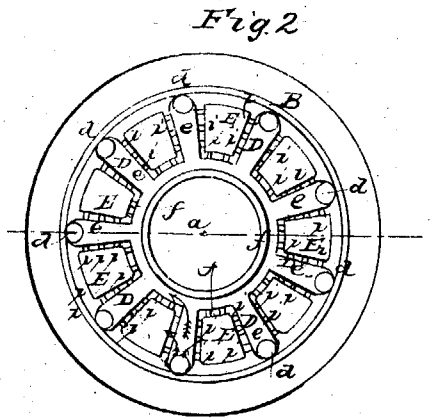
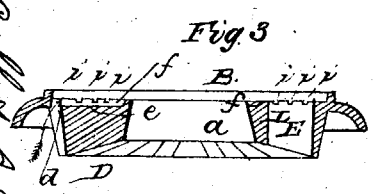
WITNESSES
A. G. Giles
J. Fraser
INVENTOR
Gilbert J. Kingsbury

UNITED STATES PATENT OFFICE.

GILBERT J. KINGSBURY, OF ROCHESTER, NEW YORK.

IMPROVEMENT IN COAL-STOVES.

Specification forming part of Letters Patent No. 23,587, dated April 12, 1859; Reissue No. 1,409, dated February 17, 1863.

*To all whom it may concern:*

Be it known that I, G. J. KINGSBURY, of Rochester, in the county of Monroe and State of New York, have invented certain new and useful Improvements in Coal-Stoves, for which Letters Patent of the United States were granted me on the 12th day of April, 1859, and for additional improvements of the same on the 18th day of September, 1860; and I do hereby declare that the following is a full and exact description thereof, reference being had to the accompanying drawings, making part of this specification.

Figure 1 is a central vertical section of my improved stove; Fig. 2, a plan of the upper portion of the fire-pot on an enlarged scale detached; Fig. 3, a central vertical section of the same part; Fig. 4, a perspective view of the intermediate cap connecting the fire pot and supply-cylinder; Fig. 5, a front elevation of the supply-door detached; Fig. 6, a plan of the supply-cylinder, representing more particularly the funnel or guard for conducting the coal to the cylinder.

Like letters designate corresponding parts in all the figures.

The outer cylinder or stove body, A, is of ordinary or convenient construction, and has within, near its bottom, a fire-pot, preferably made of two parts, B and C, the whole forming in shape the inverted frustum of a hollow cone. The lower part, C, may be plane or corrugated, but the upper part, B, is provided with a suitable number of radial bars, D D, situated intermediately with the outer and inner rim or periphery of the ring, a central opening, *a*, being left for the passage of the fuel, and having between them corresponding spaces or openings, E E, extending entirely through the said upper portion of the fire-pot, as represented most clearly in Figs. 2 and 3. Thus the heat and gases from the fire-pot have a free passage upward through these spaces, between the radial bars, outside the supply-cylinder, presently to be described.

In the top surface of each of the radial bars D D is made a longitudinal groove, *e*, communicating at the outer end with a passage or orifice, *d*, extending downward through the edge of the circular ring and opening into the chamber J below, said chamber having no connection with the ash-box, and likewise communicating at the inner end with an annular groove, *f*, around the opening *a*, as shown most clearly in Figs. 1 and 2. From the longitudinal grooves *e.e* notches *i i i* are made laterally on either side in the bars, and opening into the flame-spaces E E, and from the circular groove *f* similar notches are made communicating in like manner. On the top of the fire-pot rests a short hollow cylindrical cap, G, forming the base of the supply-cylinder hereinafter described, and substantially of the form represented in Fig. 4, being provided with radial bars D′ D′, of the same number as and similar in shape to those of the top of the fire-pot above described, which they fit closely and cover. The bottom edge of the cylinder forming the cap and the lower plane surfaces of its radial bars are preferably provided with grooves corresponding with the grooves *e f* in the top of the fire-pot which they cover; but in the case of the radial bars the grooves do not reach quite to the outer end; as that would allow an escape of the air conveyed therein. The radial bars are stiffened and braced by vertical ribs or flanges *g g*, occupying the angle between the said bars and the side of the cylinder, substantially as represented. The cylindrical cap serves as an intermediate connection and support with the fire pot and supply-chamber above, and is the medium of separation between the chamber of combustion and the outer open chamber, O, of the stove, by which means the heat and products of combustion are allowed to escape without passing through the reserved fuel. Its lower edge and radial bars also effectually cover the air-grooves, preventing the escape of the air and excluding dust therefrom. On the upper end of the cap rests a supply-cylinder, H, of sufficient capacity to contain a convenient supply of fuel. From this cylinder a constant supply of coal falls into the fire-pot as it burns away without the fire reaching above said fire-pot. The supply-cylinder above the fire-pot being thus filled, and the top closed by the cover *s*, and communication from said fire-pot to the exit-pipe K being open through the spaces E E, the intensity of the combustion is at the periphery of the fire pot and concentrates at the flame-spaces above mentioned. Thus there is no material loss occurring from internal radiation or from the heat being carried directly upward to the exit-pipe, as in ordinary stoves; but by burning away from the center to the outside of the furnace and the heat concentrating through the spaces E E close to the outer walls of the stove, the greater portion of it is radiated through the room before it reaches the escape-outlet. To increase still further the intensity of the heat at this point, and at the same time to economize to the greatest degree the burning of the gases that are produced by the combustion, I introduce air into the flame spaces E E through the grooves *e e* and *f* and notches *i i*, which air, by becoming highly heated by surrounding the fire-chamber in the space J, and by passing through the heated bars, is in best condition to accomplish the result desired. This air, by being introduced through the notches *i i* in fine jets, mingles freely with the gases, and, being effectually combined, produces a secondary combustion of those products which would otherwise escape. This combustion, by occurring directly at that point where the gas escapes from the fire, takes place at the moment that the gas is the most highly heated, and therefore the most inflammable and in the best condition to be utilized. The direction of the draft-current from the furnace through the spaces E E causes the gas-flames to impinge on the outer walls of the stove, thus increasing the radiation.

The admission of air into the circular groove *f* serves another important object besides furnishing a supply for the combustion of the gas, and that is, that by its cooling effect it prevents the iron from burning out by the intensity of the heat, its situation being in the hottest portion of the fire-chamber. The supply-cylinder terminates at the top with a conical flange or funnel-shaped rim, F, large enough to close up the area between it and the outer cylinder, A. This would obstruct the draft were not provision made to avoid it by forming notches or openings *h h* on one-half the circumference of the rim, that being the side which is opposite to the exit-pipe K, in order to bring the heat forward before it escapes, and thereby increase the heating capacity by diffusion as much as possible. The coals are fed in at a door, N, in the outer cylinder, A, and in order to conduct them into the funnel or rim of the supply-cylinder without falling between an inclined plane or chute is necessary to convey them over the space. This must be removed when the supply is effected, or it will obstruct the draft in the front portion of the cylinder. This object is accomplished by extending the bottom of the door N far enough below the hinge or axis *m*, on which it turns, to reach the edge of the flange at *k*, and thus, when the door is opened it turns down far enough to form an inclined plane, which connects with the flange at the space which is removed and made straight for that purpose, as indicated by red lines in Fig. 1. When the door is elevated to a vertical position by closing it, that portion which before formed the bridge is received into the projecting portion *l* of the outer cylinder, leaving a free space for the draft in the front of the stove. As there is constantly kept a large charge of unburned coal in the supply-cylinder above the fire-pot for the replenishing the latter by its own weight, it is frequently the case that the fire becomes too hot, and it is necessary that that some check be provided against such action. A damper in the exit-pipe K does not answer the purpose as when the draft is thus obstructed (the side draft through the spaces E E being likewise stopped thereby) the fire from the fire-pot gradually extends upward into the supply-cylinder, there being no current to carry the heat from the same. To avoid any difficulty of this kind I provide a flue-pipe, I extending from the bottom of the stove in its rear upward, (having the exit-pipe K communicating with it,) as represented in Fig. 1. The flue-pipe is provided with a suitable damper, *r*, for closing the passage. When the damper is open, a communication is opened from the ash-chamber, allowing the cooler air therein to pass up, thereby diminishing the draft through the fire-exit pipe K. Thus the passage through the pipe I not only serves as a regulator of the heat but also has a tendency to draw the heat downward from the fire-pot when desired, thereby preventing the fire from extending upward into the supply-cylinder. It also serves as a ventilator and escape for the dust caused by shaking the grate L in the bottom of the fire-pot.

What I claim as my invention, and desire to secure by Letters Patent, is—

1. The introduction of a second supply of air into the flame space or spaces at or near the junction of the fire-pot B and cap G and at or near the point where the gas escapes from the combustion of the coal, for the purpose of igniting the same in combination with an interior feeding-chamber, substantially as herein set forth.

2. I do not claim a "descending draft" for supplying air to the combustion-chamber; but I claim the annular groove *f* at the base of of the feeding-chamber, connected with an outer passage or passages for the admission of air to that point, arranged and operating substantially as herein described and set forth.

3. Providing in connection with the annular groove *f* the radial grooves *e e*, between the top of the fire-pot and the cap resting thereon, and communicating with the outside air by passages *d d*, the said grooves being provided with the lateral notches *i i i*, opening into the flame space or spaces E E for the introduction of air for admixture with the gases, substantially as herein specified.

4. The cap G or its equivalent, forming a connection between the fire-pot and feeding-cylinder when it conforms to the upper portion of the fire-pot and external air is admitted underneath for the combustion of the gases, as herein set forth.

5. The arrangement of the pivoted door N with the lower portion extended to form a plane in combination with the flange F for safely supplying coal to the cylinder H when open, and leaving a space for the passage of the products of combustion when closed, substantially as set forth.

6. In combination with the supply-cylinder H and fire-pot the flue-pipe I, connected at the bottom with the ash-chamber in such a manner that when the passage of the pipe is open it allows the escape of the heat through the same, thereby giving a counter direction to the fire, preventing it from extending into the supply-chamber, substantially as set forth.

GILBERT J. KINGSBURY.

Witnesses:
H. G. GILES,
J. FRASER.